United States Patent [19]
Whitfield

[11] 3,900,400
[45] Aug. 19, 1975

[54] DUAL FILTER ARRANGEMENT

[75] Inventor: Joseph A. Whitfield, Peoria, Ill.

[73] Assignee: Caterpillar Tractor Company, Peoria, Ill.

[22] Filed: Apr. 29, 1974

[21] Appl. No.: 465,328

[52] U.S. Cl................................. 210/238; 210/323
[51] Int. Cl.².......................................... B01D 27/08
[58] Field of Search............ 210/222, 223, 232–238, 210/322, 323, 329, 335, 339, 359

[56] References Cited
UNITED STATES PATENTS

| | | | |
|---|---|---|---|
| 1,634,463 | 7/1927 | Hills | 210/238 |
| 2,793,752 | 5/1957 | Jay | 210/234 X |
| 3,286,838 | 11/1966 | Jones | 210/323 X |
| 3,289,841 | 12/1966 | Quintly | 210/223 X |
| 3,291,307 | 12/1966 | Rosaen | 210/323 X |
| 3,314,542 | 4/1967 | Kudlaty | 210/323 X |
| 3,344,923 | 10/1967 | Pall et al. | 210/323 X |
| 3,368,680 | 2/1968 | Bozek | 210/235 X |
| 3,486,622 | 12/1969 | Rosaen et al. | 210/223 X |
| 3,503,511 | 3/1970 | Spitzberg | 210/232 |
| 3,800,948 | 4/1974 | LaVallee | 210/234 X |

*Primary Examiner*—Theodore A. Granger
*Attorney, Agent, or Firm*—Ralph E. Walters

[57] ABSTRACT

A dual filter arrangement includes an elongated container having a pair of oppositely disposed end plates and a plurality of ports defined therein for fluid ingress and egress, a wall removably disposed within the container intermediate the end plates for sealingly dividing the container into a pair of independent fluid compartments, and filter elements individually removably disposed in the fluid compartments for independently cleaning fluid flowing through the ports of their respectively associated compartments.

9 Claims, 3 Drawing Figures

PATENTED AUG 19 1975 3,900,400
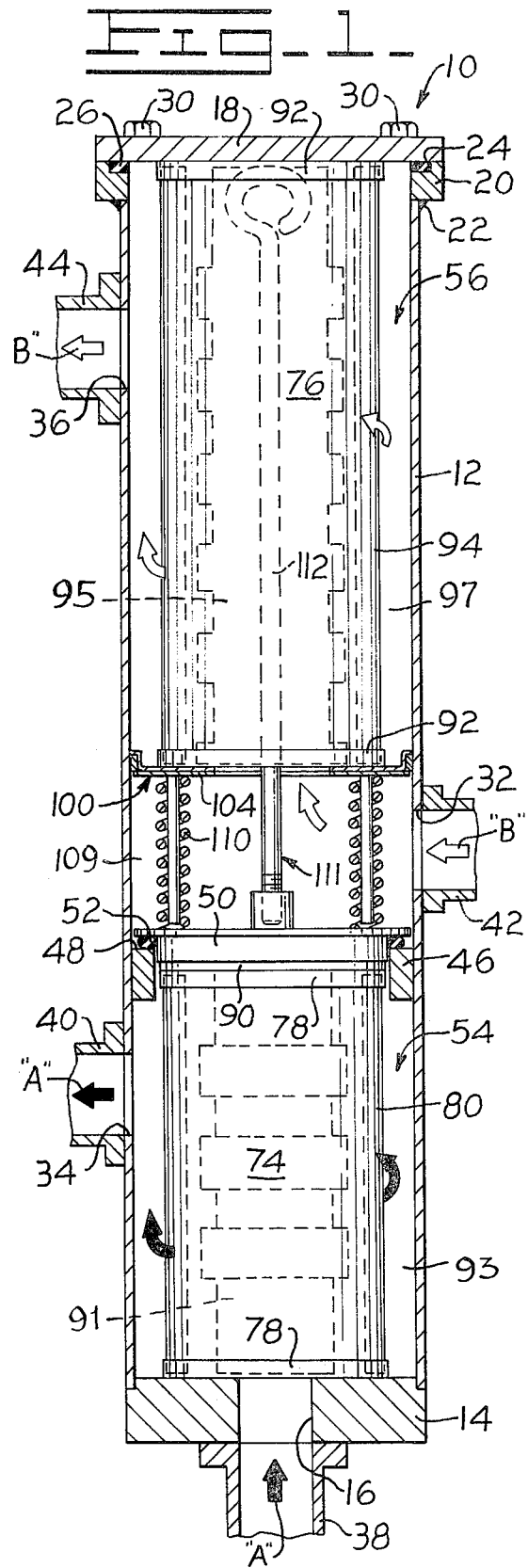
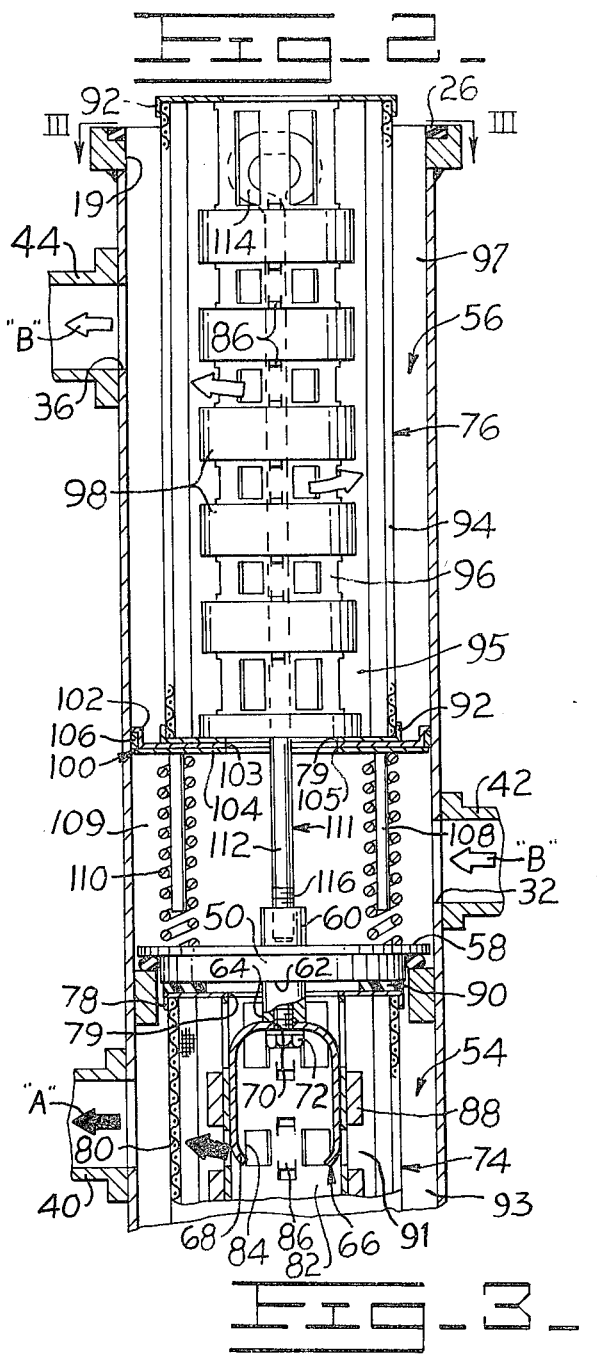
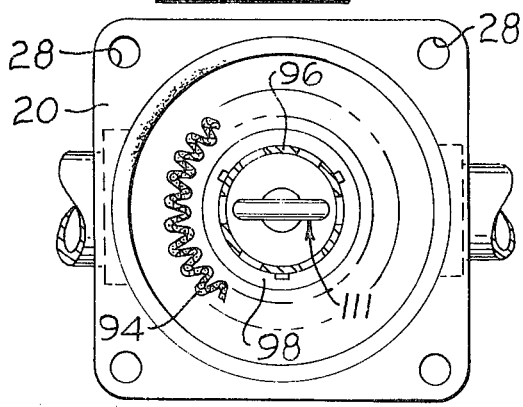

“3,900,400

DUAL FILTER ARRANGEMENT

BACKGROUND OF THE INVENTION

Multiple filter systems for vehicles and the like usually include independent, side-by-side filter housings requiring a considerable amount of space for servicing of the filters. Normally, each fluid circuit has its own housing from which an upper cap is removed to allow access to a conventional, cylindrical filter element contained therein. Such conventional systems not only require excessive space for servicing, but also are uneconomical from the standpoint that duplicate parts are required throughout. Further, each housing cap must be individually removed, cleaned and replaced which requires additional time and substantially increases the likelihood that dirt or other foreign debris might inadvertently enter the housings.

SUMMARY AND OBJECTS OF THE INVENTION

It is, therefore, an object of the present invention to provide a dual filter arrangement affording two independent filtering systems in a single container for improved economy.

Another object of the present invention is to provide such an improved dual filter arrangement having a pair of axially arranged filter elements which may be conveniently simultaneously removed for more efficient servicing thereof.

Other objects and advantages of the present invention will become more readily apparent upon reference to the accompanying drawings and the following description.

BRIEF DESCRIPTION OF THE DRAWINGS

FIG. 1 is a vertical, sectional view of the dual filter arrangement of the present invention showing a single container and a pair of axially disposed filter elements in elevation for illustrative convenience.

FIG. 2 is a fragmentary vertical sectional view of the dual filter arrangement of the present invention similar to FIG. 1, only showing the outermost filter element in biased outwardly extending relation from the upper end of the container with the cover of the container removed for servicing.

FIG. 3 is a partial sectional and top plan view taken along lines III—III of FIG. 2 through the outermost filter element.

DESCRIPTION OF THE PREFERRED EMBODIMENT

With particular reference to the drawing, the dual filter arrangement 10 of the present invention includes an elongated cylindrical container 12 having an integrally secured bottom end plate 14 with a fluid inlet port 16 centrally disposed therethrough, and also a cover or top end plate 18 which may be removed to provide an axially open end 19 thereof. Intermediate the top end plate and the container is a mounting flange 20 secured to the container through an annular weld 22. The mounting flange has a counterbore 24 for receipt of an annular resilient sealing element 26 therein. As best shown in FIG. 3, the mounting flange also includes a plurality of threaded bores 28 adapted to receive a corresponding plurality of bolts 30, which bolts secure the top end plate against the sealing element as shown in FIG. 1.

The container 12 further defines a centrally disposed fluid inlet port 32, a lower fluid outlet port 34, and an upper fluid outlet port 36 therethrough. First fluid coupling members 38 and 40 are removably secured to the bottom end plate 14 and the container 12 in the usual manner in aligned fluid communicating relation with the inlet port 16 and lower outlet port 34, respectively, while second fluid coupling members 42 and 44 are similarly aligned with the inlet port 32 and the upper outlet port 36, respectively.

An annular ring 46 is disposed within the cylindrical container 12 intermediate the end plates 14 and 18 and is rigidly secured thereto by welding or the like to provide an upwardly and outwardly facing sealing surface 48 thereon. A removable stepped flange or fluid separating wall 50 is disposed in sealing engagement with this sealing surface through an intermediate resilient seal ring 52. Such sealing engagement thereby divides the container into two independent fluid systems wherein the first is associated with a lower or innermost compartment 54, and the second is associated with an upper or outermost compartment 56.

As best shown in FIG. 2, the fluid separating wall 50 further includes an upwardly or outwardly facing surface 58 to which is centrally, integrally secured an internally screw threaded member 60. A lower or inwardly facing surface 62 on the opposite side thereof likewise has secured thereto an internally threaded member 64. A filter element centering and retaining device indicated generally by the reference numeral 66 is removably secured to the member 64 in a depending manner. Such device includes an inverted U-shaped spring element 68 with a central opening 70 therein, and a capscrew 72 is inserted through the opening and is screwthreaded into the threaded member 64 to retain it and the spring element in the desired assembly.

In the preferred embodiment of the present invention, a cylindrical filter element 74 is disposed in the lower compartment 54, and a similar cylindrical filter element 76 is disposed in the upper compartment 56 in generally axially aligned relation therewith. The lower filter element includes a pair of oppositely disposed end caps 78 individually having a central opening 79 therein and containing between them a pleated paper filter ring 80 of conventional construction as shown best in FIG. 2. A flow-directing support tube 82 is concentrically disposed within the filter ring between the end caps and in generally aligned relation with the central openings and includes a plurality of passages 84 therein and a plurality of radially outwardly extending support tabs 86. These support tabs are initially deformed outwardly to retain a plurality of annular magnetized elements 88 in axially spaced relation on the support tube, and in adjacent alignment to the passages. It should be noted that the innermost filter element 74 has its lower end cap 78 in substantial sealing engagement with the bottom end plate 14, while the upper end cap 78 is sealingly engaged with the fluid separating wall 50 through an axially compressible resilient seal ring 90 disposed therebetween. Thus the lower compartment 54 is divided by the hollow filter element into a central filter chamber 91 and a peripheral collecting chamber 93.

In a similar manner, the outermost filter element 76 includes a pair of end caps 92, and a pleated paper filter ring 94 which provides a central filter chamber 95 and a peripheral collecting chamber 97 in the upper compartment 56. The outermost filter element also has a flow-directing support tube 96, and a plurality of magnetized elements 98 comparable to those described above. However, the outermost filter element is disposed on a resiliently mounted platform 100 having a cup 102 with a central opening 103 formed therein, an annular plate 104 with a corresponding opening 105 therein, a seal ring 106 contained between them at their outer periphery, and a plurality of depending guide pins 108 which are integrally secured to the plate. A compression spring 110 is mounted on each of the guide pins between the plate 104 and the separating wall 50 in such a manner that the platform is limitedly, axially positioned within the cylindrical container 12. Since the lower end cap 92 of the outermost filter element rests on the cup 102, the upper end cap is thereby biased outwardly into sealing engagement with the top end plate 18, as best shown in FIG. 1. Such construction also provides a fluid transfer chamber 109 intermediate the separating wall 50 and the sealed platform 100 which is in open communication with the inlet port 32 and the upper central filter chamber 95.

The improved dual filter arrangement of the present invention further includes an axial positioning device 111 for simultaneously permitting installation and removal of both of the filter elements 74 and 76. The device includes a filter element removing and installing rod 112 which is disposed in an upright manner concentrically within the outermost filter element as best shown in FIG. 2. The rod includes an upper lifting eye 114, as well as a threaded lower extremity 116 so that the rod may be screwthreadably inserted into the internally screwthreaded member 60 which is affixed to the fluid separating wall 50.

OPERATION

While the operation of the present invention is believed clearly apparent from the foregoing description, further amplification will subsequently be made in the following brief summary of such operation. In the dual filter arrangement 10 of the present invention, fluid enters the lower compartment 54 through the inlet port 16 via the first fluid coupling member 38 and travels upwardly through the central opening 79 in the lower end cap 78 to be effectively distributed radially outwardly by the flow-directing support tube 82. Fluid passes radially outwardly through the plurality of passages 84 shown best in FIG. 2 and is directed closely by the annular magnetized elements 88 to better allow the larger metallic impurities to be removed therefrom. Additional deleterious particles are thereafter removed from the fluid by passing it substantially radially outwardly through the pleated paper filter ring 80. The fluid then travels outwardly from the cylindrical container 12 by way of the outlet port 34 and coupling member 40. This is shown by the fluid flow arrows identified by the letter "A." It is significant to note that this flow is effectively blocked from the upper compartment 56 by the fluid separating wall 50 and its associated seal ring 52.

Similarly, and as best shown in FIG. 2, fluid enters the upper compartment 56 through the second fluid coupling member 42 and the aligned inlet port 32 in the cylindrical container 12. It thereafter passes upwardly through the aligned openings 105, 103 and 79 to be radially distributed by the flow-directing support tube 96 as previously described for the tube 82. After passing by the magnetized elements 98 and through the pleated paper filter ring 94, the fluid exits from the container by way of the outlet port 36 and second fluid coupling member 44 as generally shown by the open arrows identified by the letter "B." As before, deleterious material and the like is removed from the fluid by the magnetized members and the filter ring 94, it being understood that the top end plate 18 is installed in place for such normal fluid flow.

With the top end plate 18 secured to the mounting flange 20 by the bolts 30, the upper filter element 76 is seated on the resiliently mounted platform 100 as best shown in FIG. 1. Under these conditions, the plurality of compression springs 110 apply a relatively light axial loading intermediate the upper surface 58 of the separating wall 50 and the annular plate 104 associated with the platform. Thus, a relatively light compression load is also applied to the resilient seal ring 52 by the separating wall and effective fluid independency of the two fluid compartments 54 and 56 is achieved.

In order to service the filter elements 74 and 76, the bolts 30 are threadably unscrewed from the mounting flange 20 to permit removal of the top end plate 18. As best shown in FIG. 2, this allows the compression springs 110 to bias the platform 100 and upper filter element mounted thereon upwardly so that it extends outwardly beyond the axially open end 19 of the container 12 to permit it to be more conveniently and independently removed therefrom. Alternately, if desired, the eye 114 may be easily grasped and lifted so that the filter removing rod 112 and the associated separating wall 50 may also be moved upwardly. This not only raises the upper filter element, but also raises the lower filter element since it is lightly retained by the U-shaped spring element 68 upwardly against the associated separating wall. Thus, by simply lifting the rod the entire contents of the container 12 may be removed as a unit for more expeditious servicing. After servicing, these components or their replacements can be conveniently lowered into the container.

It is thus apparent that the improved dual filter arrangement of the present invention provides two independent, axially arranged filtering systems in a single elongated container for improved economy. Further, the single container advantageously requires a minimum of radial space and the individual filter elements contained therein can be selectively removed as a unit, or alternately the outermost filter element can be selectably and conveniently individually removed.

While the invention has been described and shown with particular reference to a preferred embodiment, it is apparent that variations might be possible that would fall within the scope of the present invention, which is not intended to be limited except as defined in the following claims.

What is claimed is:

1. A dual filter arrangement comprising;
an elongated housing having a removably closable end;
a pair of hollow filter elements removably disposable in said housing in axially spaced relation and individually defining a filter chamber centrally therein;
divider wall means removably disposable within the housing intermediate said filter elements dividing the housing into a pair of axially spaced and independent filter compartments, said divider wall means including a pair of axially spaced apart divider walls defining a fluid transfer chamber therebetween within the housing between adjacent ends of said pair of filter elements with one of said divider walls having an opening therethrough communicating said transfer chamber with one of said filter chambers;

said housing having a fluid inlet port and a fluid outlet port for each compartment with one of said ports being in fluid communication with said fluid transfer chamber; and means connected to said divider wall means for withdrawing said divider wall means and both of said filter elements as a unit from said removably closable end of said housing.

2. The dual filter arrangement of claim 1 including supporting surface means within said housing, and wherein said divider wall means includes resilient loading means for biasing one of said divider walls into sealing engagement with said surface means to prevent leakage between said pair of filter compartments.

3. The dual filter arrangement of claim 2 wherein said pair of filter elements includes an outer filter ring which is biased outwardly beyond said removably closable end by said resilient loading means for convenient, independent removal thereof.

4. The dual filter arrangement of claim 1 wherein said means connected to said divider wall means includes retaining means to relatively loosely and releasably secure an axially innermost one of said filter elements to an axially innermost one of said divider walls.

5. The dual filter arrangement of claim 1 wherein said means connected to said divider wall means includes an elongated rod extending axially inwardly for engagement with said divider wall means so that withdrawal thereof simultaneously removes said filter elements from said housing.

6. A dual filter arrangement comprising;

an elongated housing having a removably closable end and an axially opposite end;

a pair of hollow filter elements removably disposable in said housing in axially spaced aligned relation;

divider wall means removably disposable within the housing intermediate said filter elements for dividing the housing into a pair of axially spaced and independent filter compartments and with the filter elements defining a central chamber and a peripheral chamber in each of said compartments;

separate fluid inlet and outlet ports in said housing for each compartment so that said ports are individually arranged in fluid communication with said chambers for permitting radial fluid flow independently through said hollow filter elements; and positioning means for withdrawing said divider wall means and both of said filter elements as a unit from said removably closable end of said housing.

7. The dual filter arrangement of claim 6 wherein said elongated housing is a cylindrical container which includes an annular sealing surface therewithin and said divider wall means includes a divider wall disposed in biasably sealed engagement with said annular sealing surface.

8. The dual filter arrangement of claim 7 wherein said positioning means includes an elongated rod which is secured to said divider wall in outwardly extending easily grasped relation therefrom.

9. The dual filter arrangement of claim 8 wherein said positioning means includes retaining means to relatively loosely and releasably secure an innermost one of said filter elements to said divider wall.

* * * * *

UNITED STATES PATENT OFFICE
CERTIFICATE OF CORRECTION

PATENT NO. : 3,900,400
DATED : August 19, 1975
INVENTOR(S) : Joseph A. Whitfield It is certified that error appears in the above—identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-fifth Day of November 1975

[SEAL]

Attest:

RUTH C. MASON
Attesting Officer

C. MARSHALL DANN
Commissioner of Patents and Trademarks